US012718247B2

(12) United States Patent
Drapeau et al.

(10) Patent No.: US 12,718,247 B2
(45) Date of Patent: Aug. 25, 2026

(54) SYSTEMS AND METHODS FOR EFFICIENT PROGRESSIVE FRAUD DETECTION

(71) Applicant: STRIPE, LLC, South San Francisco, CA (US)

(72) Inventors: Ryan Lee Drapeau, Seattle, WA (US); Dulwin Eksith Jayalath, Seattle, WA (US)

(73) Assignee: Stripe, LLC, South San Francisco, CA (US)

( * ) Notice: Subject to any disclaimer, the term of this patent is extended or adjusted under 35 U.S.C. 154(b) by 23 days.

(21) Appl. No.: 18/505,767

(22) Filed: Nov. 9, 2023

(65) Prior Publication Data

US 2025/0156869 A1 May 15, 2025

(51) Int. Cl.
*G06Q 20/40* (2012.01)

(52) U.S. Cl.
CPC ................................ *G06Q 20/4016* (2013.01)

(58) Field of Classification Search
None
See application file for complete search history.

(56) References Cited

U.S. PATENT DOCUMENTS

2017/0140382 A1* 5/2017 Chari .................. G06Q 20/389
2021/0192525 A1* 6/2021 Jameson ........... G06Q 30/0185

* cited by examiner

*Primary Examiner* — Matthew S Gart
*Assistant Examiner* — Liz P Nguyen
(74) *Attorney, Agent, or Firm* — FINNEGAN, HENDERSON, FARABOW, GARRETT & DUNNER, LLP

(57) ABSTRACT

A method and apparatus for efficient and progressive fraud detection are described. Transactions are received by a server computer system and include attributes and transaction data. To determine whether a transaction is fraudulent, and thus should be rejected, a progressive fraud determination process is performed by the server computer system. The progressive fraud determination process includes performing a first set of one or more transaction fraud determinations based on a first set of features determined for the transaction. When the first set of one or more transaction fraud determinations identifies the transaction as fraudulent or legitimate, the progressive fraud determination process is terminated based on this decision, and before performing additional successive fraud determination processes. By exiting the progressive fraud determination process early, substantial processing, memory and bandwidth savings can be realized without sacrificing fraud detection accuracy.

20 Claims, 7 Drawing Sheets

FIG. 4

SYSTEMS AND METHODS FOR EFFICIENT PROGRESSIVE FRAUD DETECTION

BACKGROUND

Merchants, such as grocers, car services, dry cleaning services, online marketplaces, etc., provide their products and services to consumers. Such merchants may employ agents to deliver their products and/or provide the actual services to the merchant's customers. For example, a person acting on the merchant's behalf will drive a consumer in their own car, deliver food ordered through a merchant website, pick up and/or drop off clothes dry cleaned by the merchant, etc.

These merchants, although providing systems for supplying products and/or services to consumers, often do not perform the financial processing associated with the merchant transactions. Instead, merchants utilize commerce systems to process financial transactions for the products and/or services provided to consumers. This may include the merchant, agent, and other users establishing accounts with the commerce system. Once the accounts are established, merchants can run financial transactions using the services of the commerce system, merchant agents can accept payments from customers on behalf of the merchant for provided products and/or services, and the commerce system can process the payments, performs payouts for services rendered, as well as other financial processing services. This processing of payments by the commerce platform may include running credit cards, crediting a merchant account for the transaction, crediting the agent responsible for the transaction, debiting a commerce system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of a merchant.

To prevent fraudulent transactions, such as when a proffered payment is made with a stolen card number, a card number from an expired card, a spoofed card, etc., the commerce system may perform fraud detection on each transaction. Such fraud detection can include attempting to determine, based on parameters associated with the transaction, whether there is a likelihood that the transaction is fraudulent. For example, whether a card number is associated with past fraudulent transactions, whether the transaction amount or purchase location is a-typical for the card number, what IP address a remote transaction has originated from in relation to prior transactions and/or the current transaction, etc. Thus, the fraud detection seeks to determine when one or more factors associated with the transaction indicate fraud, such as by employing machine learning techniques to analyze transaction data and the parameters associated with the transaction.

However, fraud detection at scale (e.g., millions to billions of transactions a day) is an immensely resource intensive process. That is, for example, for each transaction, a set of machine learning features are generated and/or fetched, the information communicated from a source system providing to and/or computing those features for the system executing one or more machine learning model(s), and then executing the machine learning model(s) concurrently or sequentially. Thus, at scale, the feature generation, communication exchanges, and machine learning computations, consume a massive amount of computing resources, network bandwidth, and memory. Additionally, as attack vectors become more sophisticated and/or varied, the number of features used, the data used to generate those features, and complexity of the machine learning model(s) increases, therefore further expanding the already resource intensive fraud detection process. This can additionally increase overall transaction latency by introducing additional latency into the fraud detection process performed to approve or reject the transaction, which accordingly introduces additional time and computing resources consumed into the overall processing of the transaction.

Therefore, technical solutions are needed to reduce resource consumption of fraud detection systems operating at scale, and to reduce latency of fraud detection to reduce overall transaction time.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

FIG. 4 is a flow diagram of one embodiment of a method for performing efficient progressive fraud detection by a server computer system.

DETAILED DESCRIPTION

Figure 1:
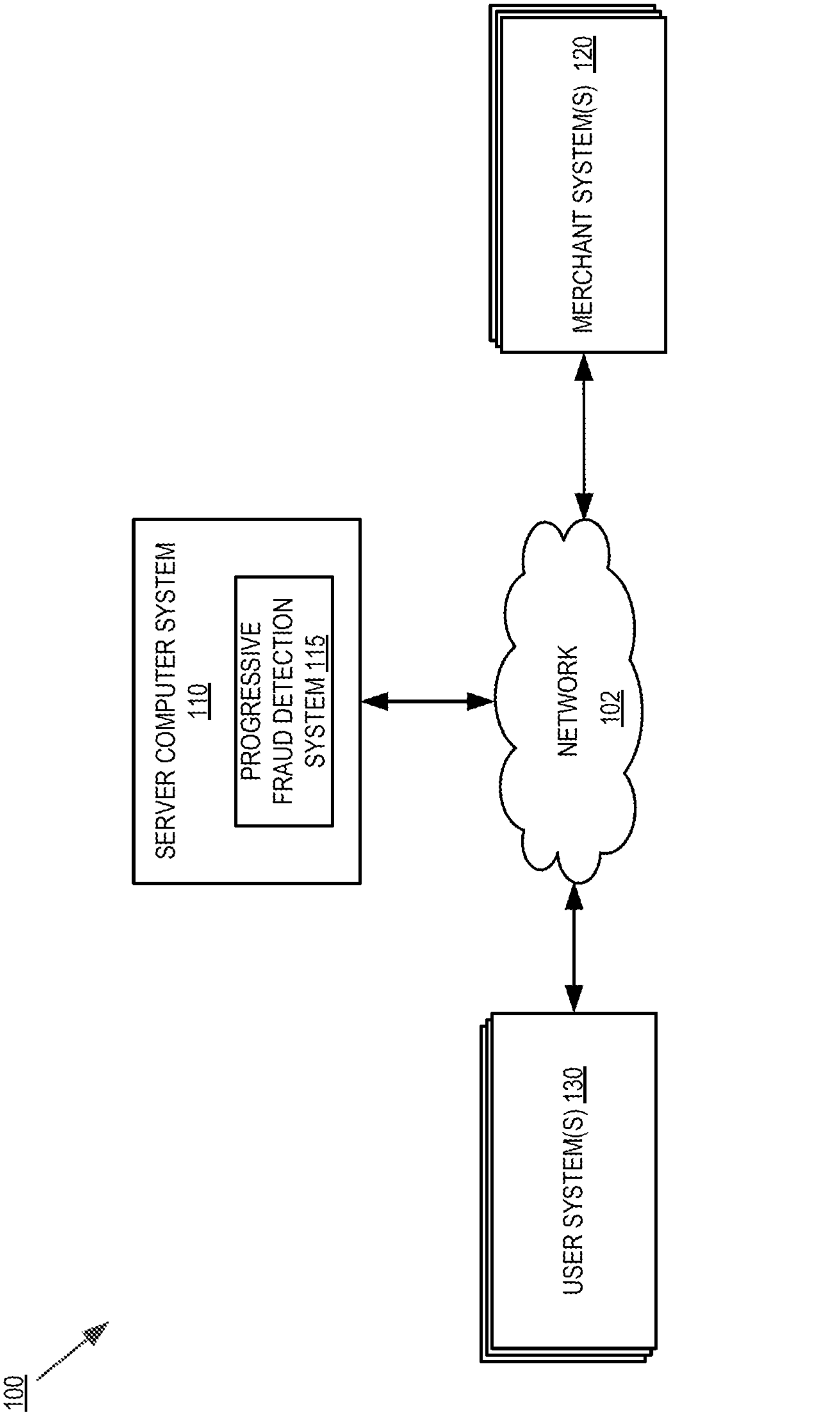
FIG. 1 is a block diagram of an exemplary system architecture for a server computer system providing efficient progressive fraud detection.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "initiating", "terminating", "performing", "processing", "generating", "transmitting", "accessing", "caching", "returning", "clearing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system 100 architecture for a server computer system providing efficient progressive fraud detection. In one embodiment, the system 100 includes server computer system 110, one or more merchant system(s) 120, and one or more user system(s) 130. In one embodiment, one or more systems (e.g., system 120 and 130) may be mobile computing devices, such as a smartphone, tablet computer, smartwatch, etc., as well computer systems, such as a desktop computer system, laptop computer system, server computer systems, etc. The server computer system 110 and merchant system(s) 120 may also be one or more computing devices, such as one or more server computer systems, distributed systems, desktop computer systems, etc.

The embodiments discussed herein may be utilized by a plurality of different types of systems, such as other commerce platform system(s) including payment processing systems, card authorization systems, banks, and other systems seeking to identify and detect fraud during transactions. Furthermore, any system seeking to identify fraud during transactions between remote systems, such as systems that process financial, social media, microblogging, medical, gaming, etc. transactions, may use and/or extend the techniques discussed herein to provide for efficient progressive fraud detection. However, to avoid obscuring the embodiments discussed herein, fraud detection during commercial transactions is discussed to illustrate and describe the embodiments of the present invention, and is not intended to limit the application of the techniques described herein to other systems in which transaction fraud detection is performed.

The server computer system 110, merchant system(s) 120, and user system(s) 130 may be coupled to a network 102 and communicate with one another using any of the standard protocols for the exchange of information, including secure communication protocols. In one embodiment, one or more of the commerce platform system(s) 110, merchant system (s) 120, and user system(s) 130 may run on one Local Area Network (LAN) and may be incorporated into the same physical or logical system, or different physical or logical systems. Alternatively, the commerce platform system(s) 110, merchant system(s) 120, and user system(s) 130 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, server computer system 110 provides financial processing services to one or more merchants, such as to merchant system(s) 120 and/or user system(s) 130. For example, server computer system 110 may manage merchant accounts held at the commerce platform, run financial transactions from user system(s) 130 performed on behalf of a merchant, clear transactions, perform payouts to merchant and/or merchant agents, manage merchant and/or agent accounts held at the commerce platform system(s) 110, as well as other services typically associated with commerce platforms systems such as, for example, STRIPE™.

To prevent fraudulent transactions, in embodiments, server computer system 110 utilizes a progressive fraud detection system 115 to analyze transactions received by server computer system 110 (e.g., user system 130 initiated transactions and/or merchant system 120 initiated transactions, or user system 130 transactions provided to server computer system 110 via a merchant system 120). Progressive fraud detection system 115 analyzes each transaction to determine whether the transaction is legitimate (e.g., non-fraudulent) and valid (e.g., satisfies formatting, security, and other rule-based requirements), or whether the transaction is fraudulent or invalid. A transaction processing system (not shown) uses the fraud detection results of the progressive fraud detection system 115 to process or reject the transaction.

As will be discussed in greater detail below, the progressive fraud detection system 115 executes progressive sets of fraud detection stages, such as a first static rules-based fraud detection stage, a more dynamic second stage of rules analysis and/or light machine learning (ML) analysis, a third full ML analysis stage using one or more ML models, etc. The ML models that may be utilized by the progressive fraud detection system 115 can include any combination of neural network based models, tree based models, support vector machine models, classification based models, regression based models, etc., that analyze features associated with a transaction, such as card number used in a transaction, email address used in the transaction, dollar amount of a transaction, etc., as well as fraud detection features generated by the commerce platform for use by the ML models when analyzing the transaction, such as a number of transactions on a card used in the transaction, a typical dollar amount of transactions for the card, whether the card number has been used with the email address in a prior transaction, distance between a known cardholder address and a purchase and/or delivery location, etc.

Furthermore, each of these stages utilizes different feature sets for performing their respective fraud detection, such that the first stage uses the least amount of fraud detection features, the second stage uses a greater amount of fraud detection features, the third stages uses an even greater amount or complete set of fraud detection features, and so on. In embodiments, the computation performed at each successive stage is increasingly complex (e.g., consumes more compute resources), and further the features used for performing fraud detection at each successive stage grows in number of features and/or data used to generate features. The stages and their respective fraud detections are discussed in greater detail below.

In embodiments, if progressive fraud detection system 115 detects fraud or lack of fraud to a sufficient degree of accuracy at an earlier stage of the progressive set of fraud detection stages, the process can exit the progressive fraud detection system 115 to finish processing the underlying transaction without executing the more computational, bandwidth, and memory intensive later stages. With such an early exit, unnecessary consumption of compute, memory, and bandwidth resources are avoided to improve the resource utilization of the progressive fraud detection system 115. Furthermore, with an early exit, the latency of the more complex fraud detection stages are avoided to ensure a minimum amount of latency is introduced by the progressive fraud detection system 115 in order to make an accurate determination of the existence or non-existence of fraud in a transaction.

Furthermore, when starting from the viewpoint of a server computer system (e.g., server computer system 110) that operates a legit business, then most of the transactions received by the server computer system are presumably valid/legitimate. Then, only a fraction of the overall transactions are likely to be invalid/fraudulent. That is, for example, 99.9% of transactions received by the server computer system are valid and legitimate, and only 0.1% of the transactions are fraudulent. Typically, systems seek to perform fraud detection by performing a full analysis of each transaction, such as performing fraud detection similar to the final stage of the progressive fraud analysis discussed herein, which results in a misallocation of computing resources to a vast number of presumably valid and legitimate transactions. As discussed herein, identification of legitimate transactions and some fraudulent or invalid transactions can be performed more efficiently than a full ML based fraud detection that identifies fraudulent transactions. This is because often times, fraudulent transactions are more difficult to detect computationally and often require a more complete feature set for performing an ML analysis. Therefore, to avoid a mismatch in the allocation of compute, bandwidth, and memory resources, the presently described embodiments utilize the progressive stages of fraud detection that employ more efficient techniques more likely to identify legitimate or obviously illegitimate/invalid transactions early in a progressive fraud detection process, and save a full fraud detection analysis for transactions where fraud detection at earlier stages is inconclusive. Thus, earlier stages may identify transactions as legitimate or illegitimate/invalid obviating the need for further analysis at later more resource intensive stages. Beneficially, even if a fraction or small percentage of transactions makes an early exit from the progressive fraud detection discussed herein, the resource savings in terms of preserving compute, memory, and bandwidth is significant, and overall transaction latency can be reduced.

Furthermore, the present embodiments reduce consumption compute resources to safely (e.g., without increasing fraud) allow valid/legitimate transactions to proceed. Then, computationally expensive fraud processes are delayed and applied to the more transactions for which transaction fraud detection is most challenging. That is, the embodiments discussed herein provide a more efficient distribution of resources to the right places during fraud detection.

Figure 2:
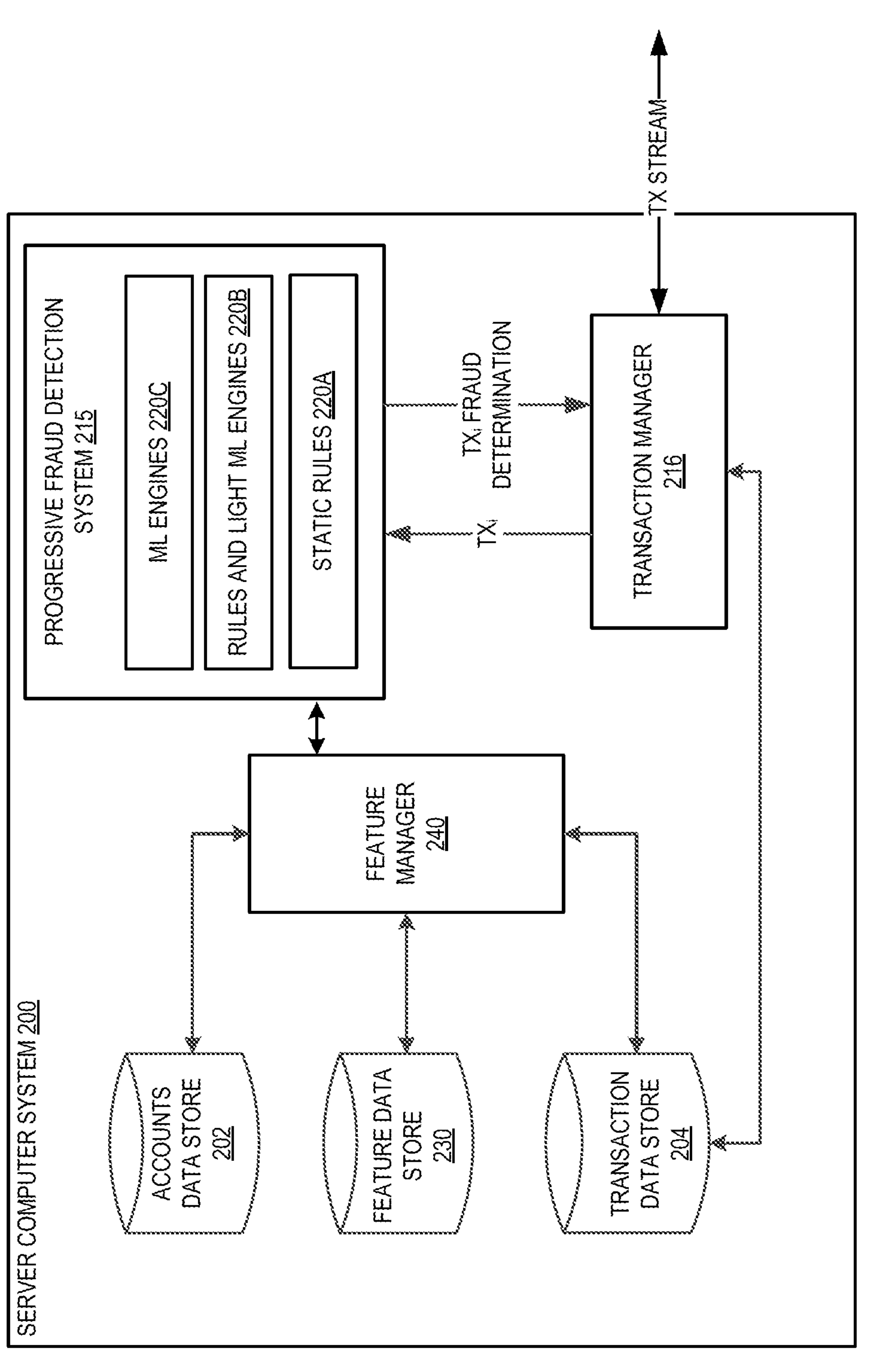
FIG. 2 is a block diagram of one embodiment of a server computer system with a progressive fraud detection system.

FIG. 2 is a block diagram of one embodiment of a server computer system 200 with a progressive fraud detection system 215. Sever computer system 200 provides additional details for the server computer system 110 discussed above in FIG. 1.

In one embodiment, server computer system 200 includes a transaction manager 216 for receiving a stream of transactions, such as user system originated transactions, merchant system originated transactions, as well as other transactions. Transaction manager 216 stores received transaction data in transaction data store 204 for each received transaction in the transaction stream, e.g., transaction amount, transaction origin, data of parties associated with a transaction, payment instrument used for a transaction, IP address of a machine originating a transaction, shipping destination, as well as any other relevant transaction data. As discussed above, server computer system 200 operates at scale, so that transaction stream includes millions, billions, or more transactions to be processed by the transaction manager 216 per day, hour, minute, etc. Furthermore, although not shown, transaction manager 216 includes interfaces to remote systems, such as banking systems, credit systems, authentication systems, etc. for communicating transaction related information to clear and process a transaction, for example, after fraud detection is performed.

For each transaction, such as transaction$_i$, transaction manager 216 consults with progressive fraud detection system 215 as to whether the transaction is valid and legitimate, and thus should be processed to completion, or whether the transaction is invalid or illegitimate, and thus should be rejected. It should be noted that transaction validity refers to factors associated with the mechanisms of the transaction, such as using a valid payment source, using a valid encryption or API key, ensuring a transaction messaging is formatted correctly, providing a correct number of digits to identify a payment source, etc., whereas transaction legitimacy refers to a transaction being fraudulent or non-fraudulent, such as identifying a transaction using a spoofed or stolen payment source, a transaction using a valid payment source but originated from a non-owner of that payment source, etc.

In one embodiment, server computer system 200 further includes an accounts data store 202 that stores data associated with merchant and user accounts (e.g., account identifiers, encryption or API keys, passwords, biographic and geographic data describing account owners, and any other relevant account data), and feature data store 230 where fraud detection features are stored and/or cached for fraud detection analysis by the progressive fraud detection system 215 (e.g., computed fraud detection features such as total number of transaction associated with a user over all time, total number of transactions associated with a payment instrument over a period of time, number of rejected transactions associated with a user or payment instrument over a period of time, average transaction amount, or other fraud detection features that can be derived from the data within data stores 202 and 204).

When progressive fraud detection system 215 receives a transaction (e.g., transaction$_i$) from the transaction manager 216, progressive fraud detection system 215 generates a fraud determination that is returned to the transaction manager 216 indicating a prediction of whether or not the transaction is fraudulent. Transaction manager 216 will either process the transaction to completion or reject the transaction based, at least in part, on the fraud determination of the progressive fraud detection system 215. Because transaction manager 216 processes a large amount of transactions, progressive fraud detection system 215 is configured to perform a fraud detection process that preserves resources and reduces latency using a progressive set of transaction fraud detection processes, as discussed in greater detail herein.

In embodiments, progressive fraud detection system 215 performs a progressive fraud detection processing using static rules 220A, rules and light ML engines 220B, and ML engines 220C. As will be discussed in greater detail below, the static rules 220A, rules and light ML engines 220B, and ML engines 220C of the progressive fraud detection system 215 represent example stages of a progressive fraud detection analysis process. More or less stages may be used by the progressive fraud detection system 215 consistent with the discussion herein.

In embodiments, each analysis stage of the progressive fraud detection system 215 interacts with feature manager 240 to obtain fraud detection features required for the analysis to be performed by each of the static rules 220A, rules and light ML engines 220B, and ML engines 220C. The fraud detection features used, and thus requested from feature manager 240, by static rules 220A, rules and light ML engines 220B, and ML engines 220C are different. In embodiments, static rules 220A uses a smallest feature set in total number of features and/or computation of features, rules and light ML engines 220B use a larger set of features in one or more of number and/or computation of the corresponding features, and ML engines 220C use a largest number of features and computation of the features.

For example, static rules 220A may include a set of rules that determine whether a received API key is valid, whether a request type is valid, whether payment information is coherent, whether a payment source is trusted (e.g., reoccurring subscriptions, linked payment partner accounts), a determination that the API key is associated with a merchant from which the transaction was received, a transaction type determination of the received transaction, a coherency check on payment information received with the transaction, an amount of the transaction is non-negative and/or valid, the parameters and/or API request is valid for the received transaction, a check of the transaction location against a set of blocked transaction locations, etc. Thus, the static rules 220A request computationally easy attributes or features of a transaction from feature manager 240, which generates the features from data store 202 and transaction data store 204. Feature manager caches the computed features in feature data store 230 for the life of the transaction. Because the features are computationally easy to derive, and the rules executed by static rules 220A are computationally efficient to evaluate, static rules 220A provides a fast, computationally efficient, low memory usage, and low bandwidth consumption analysis of a transaction to detect whether the transaction can be identified as legitimate and valid (e.g., non-fraudulent), or illegitimate or invalid (e.g., fraudulent). When a decision on fraud/non-fraud can be made by static rules 220A, a fraud determination result is provided to transaction manager 216, and the progressive fraud detection process exists the progressive fraud detection system 215 without the execution or analysis of the other progressive stages 220B and 220C.

As an example, the static rules 220A may be defined to identify a particular subset of transactions that are always valid or always invalid. This particular subset may represent, for example, 5% of a total transaction volume. However, because the processing and resources used by static rules 220A is relatively minimal compared to the ML engines 220C and much less than the rules and light ML engines 220B, the overall processing, memory, and bandwidth saving of an early exit equate to a corresponding drop (e.g., 5%) in processing, memory, and bandwidth. At scale, this 5% savings represents a significant reduction in resource utilization, and thus efficiency gains of server computer system 200.

When static rules 220A cannot make a conclusive fraud determination, a successive stage of the progressive fraud detection system 215 performs a transaction fraud analysis. In embodiments, rules and light ML engines 220B is the next progressive stage and perform more computationally complex operations that attempt to identify transactions as valid and legitimate (e.g., non-fraudulent). In embodiments, the rules of rules and light ML engines 220B include the analysis of more computationally complex features over those of static rules 220A. For example, rules and light ML engines 220B may include rules to blocking transactions from sanctioned countries, detect when a distance between a payment location and shipping location exceed a threshold, perform rate limiting (e.g., don't accept a transaction where has been payment instrument used X number of time in time period T, etc.), perform secret API key leak detection (e.g., detecting data such as different X IP addresses used for same API key within a time period), etc. Thus, the rules of rules and light ML engines 220B obtain more sophisticated features from feature manager 240, which may be derived from accounts data store 202, transaction data store 204, and/or from previously computed cached features in feature data store 230.

Furthermore, rules and light ML engines 220B includes one or more ML engines that utilize model(s) pre-trained to detect legitimate transactions on a first set of ML features. In embodiments, the first set of ML features are lightweight features, such as counter based features that track a number of times a card used in the current transaction has been seen on prior transactions, features based on comparison of values (e.g., is an email received with a transaction on a block list, do the name and email submitted with a transaction look similar), as well as other features that are relatively computationally easy to compute. In embodiments, the model(s) can include any type or combination of models, such as neural network, tree, support vector machine, generators, etc. trained using legitimate and illegitimate transaction training data, corresponding features form the first set of ML features, and annotated fraud determinations. Then, an iterative ML training process can be run before deployment by the rules and light mL engines 220B. Once trained, the ML engines identify non-fraudulent transactions using an ML feature set computed by feature manager 240 for a transaction (e.g., transaction$_i$) that corresponds to a first set of ML features. The first feature set used by rules and light ML engines 220B is less (e.g., fewer in number and/or less computationally complex to drive) than the non-ML feature set used by static rules 220A.

When the ML engines identify a transaction as non-fraudulent and rules are determined not to be violated, rules and light mL engines 220B determines the transaction to be non-fraudulent. This decision can be returned to transaction manager 216, and the fraud detection process makes an early exit from progressive fraud detection system 215. Similar to the discussion above, a further subset of transactions (e.g., for example, an additional 10-50% of transactions) may be identified as legitimate by rules and light mL engines 220B thus avoiding the analysis performed by ML engines 220C.

As will be discussed below, ML engines 220C is the most sophisticated fraud detection stage, and as such uses the most complete feature set (e.g., order(s) of magnitude greater in number than features used rules and light ML engines 220B, and using more computationally expensive features to compute). By avoiding computation of such via an early exit after the rules and light ML engines 220B detection of a non-fraudulent transaction, even if only for a percentage of transaction (e.g., 20-45%), this again is a significant resource savings for the server computer system.

When rules and light ML engines 220B cannot make a conclusive fraud determination, a successive stage of the progressive fraud detection system 215 performs a transaction fraud analysis. ML engines 220C is a stage of the progressive fraud detection system 215 that performs a full feature set fraud analysis of the most challenging transaction (e.g., those for which making a rule and ML based fraud detection is most challenging). Due to the challenging nature of making a fraud determination, the ML engines 220C use a second set of one or more pre-trained ML models trained on a second ML feature set. The second ML feature set includes a greater number of features over the first set (e.g., orders of magnitude more) and includes more computationally expensive features to compute (e.g., features accessing a greater data basis, feature involving computation over a total number of fraudulent transactions associated with a payment instrument over an entire history, a total number of transactions associated with a user, one or more features computed to determine deviation from average amounts (e.g., a deviation of a current transaction compared to an average transaction amount associated with a merchant system), one or more graph based features (e.g., features computed to connect attributes used in a current transaction with attributes in past transactions, such as by building one or more graphs based on transaction identifiers and metadata, processing these graphs using a connected components analysis, and analyzing resulting clusters to determine if the current transaction is similar, etc.). The second ML feature set can include, for example hundreds of features computed by feature manager 240 from accounts data store 202, transaction data store 204, and previously computed and cached ML features from the first set of ML features in the feature data store 230. Furthermore, the ML models can include full featured and pre-trained ML models, such as ensembles of ML models, sequential ML models, etc., trained to utilize the second ML feature set. Thus, the second ML feature set is the most robust and heavy exerting the greatest load on feature manager 240 when computing the second ML feature set.

ML engines 220C feed the features returned by feature manager into the one or more ML models of the ML engines 220C to render a fraud determination to the transaction manager 216. In embodiments, the ML engines 220C represents a final fraud determination stage that will process the transaction. Thus, transaction manager 216 will utilize the decision of ML engines 220C to process or reject the transaction, as discussed herein.

Furthermore, in embodiments, upon ML engines 220C providing fraud determination to transaction manager 216, ML engines 220C notify the feature manager 240 to clear the feature data stored in feature data store for the transaction.

Figure 3:
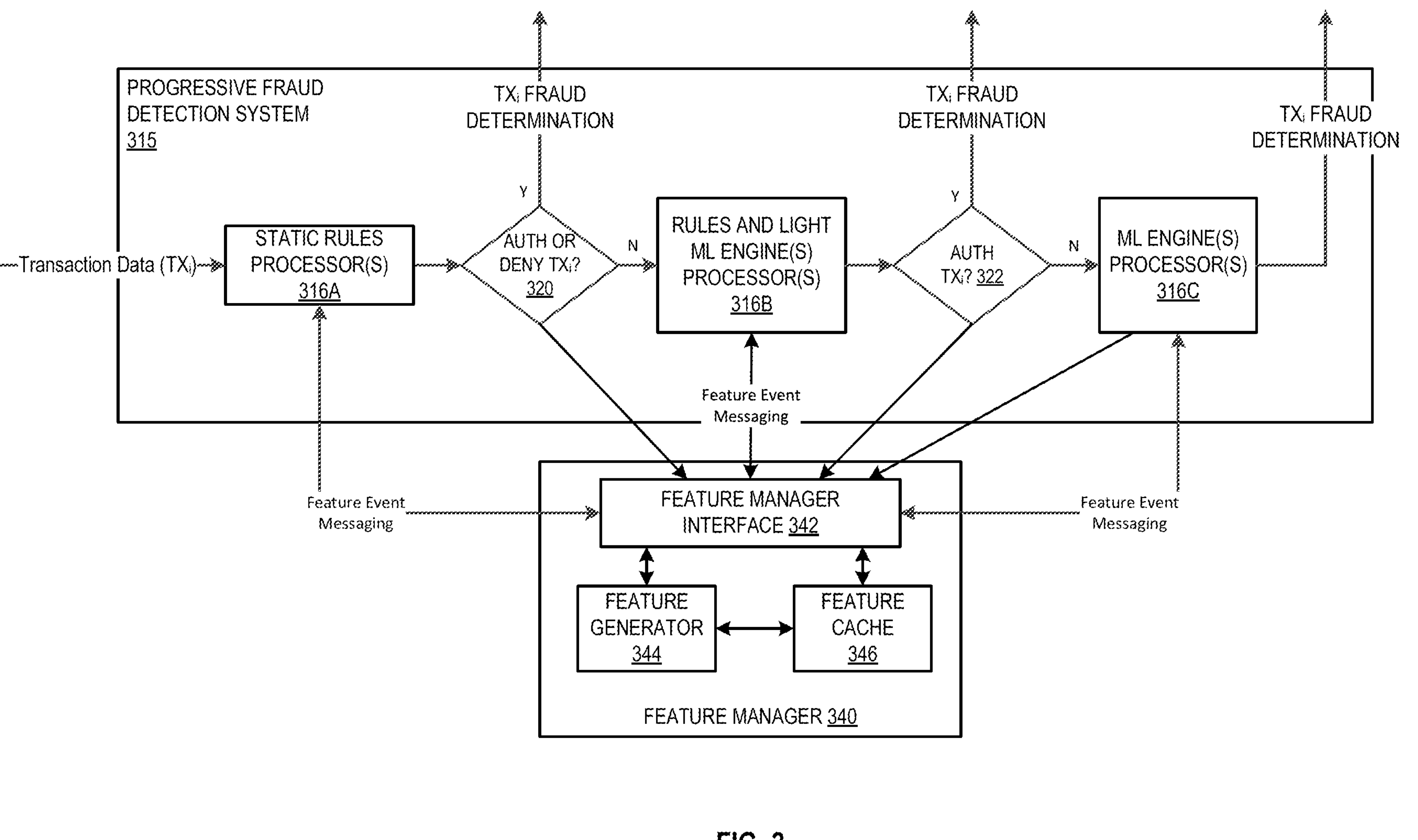
FIG. 3 is a flow diagram of one embodiment of a process performed by a progressive fraud detection system.

FIG. 3 is a flow diagram of one embodiment of a process performed by a progressive fraud detection system 315. The process is performed by processing logic that may comprise hardware (circuitry, dedicated logic, etc.), software (such as is run on a general purpose computer system or a dedicated machine), firmware, or a combination. In one embodiment, the process is performed by a progressive fraud detection system of a server computer system (e.g., progressive fraud detection system 115 or 215 of a server computer system 110 or 200).

The process begins when static rules processor(s) 316A receive transaction data for a transaction ($TX_i$). In embodiments, the transaction data corresponds with a financial transaction requested to be processed by a server computer system, and provided from a transaction manager (e.g., transaction manager 216) to the static rules processor(s) 316A. The transaction data can include a set identifiers that identify the transaction, parties to the transaction, payment source identifiers, etc. Static rules processor(s) 316A, in response to receiving the transaction data, generate a feature event message that requests a set of features to be input into a set of static rules executed by processor(s) 316A, as discussed above. Static rules processor(s) 316A communicate the feature event message to feature manager interface 342 of feature manager 340.

Feature manager 340, upon receiving the feature event message, triggers feature generator 344 to generate the requested set of features. In embodiments, this can include feature generator 344 checking feature cache 346 to determine if the features are either fully or partially computed, and interacting with one or more data stores (e.g., transaction and/or account data stores) to obtain the set of requested features. Feature generator 344 builds the requested set of features, caches the computed results of those features in feature cache 346, and returns the computed features to static rules processor(s) 316A.

Static rules processor(s) 316A receive the features from feature manager 340 and execute a set of one or more static rules to identify the transaction as fraudulent or non-fraudulent. Based on this, a decision logic 320 of progressive fraud detection system 315 determines whether or not to authorize or deny the transaction. That is, based on the features, when one or more rules can conclusively identify the transaction as non-fraudulent or fraudulent, a transaction fraud determination is output and the fraud detection process exists the progressive fraud detection system 315, and a transaction complete message is communicated to feature manager interface 342 to clear the features from feature cache 346. As discussed above, the static rules and features used for analysis by the static rules are the least compute, memory, and bandwidth intensive of the stages (e.g., stages 316A, 316B, and 316C). However, these are high quality features computed for every transaction, and selected for their suitability of use in all stages of the progressive fraud detection system 315. Thus, the early exit prevents the unnecessary resource consumption by the subsequent stages for a subset of transactions processed by progressive fraud detection system.

However, when a determination to authorize or deny a transaction is inconclusive (e.g., all of the rules of static rules processor(s) 316A fail to be met), the process proceeds to rules and light ML engine(s) processor(s) 316B. Similar to the discussion above, rules and light ML engine(s) processor(s) 316B generates a feature event message for another set of features to be used for fraud detection analysis. The feature event message is communicated to feature manager interface 342, and feature manager 344 again computes the request feature set from various data sources of a server computer system as well as the feature cache 346. Feature manager interface 342 returns the requested feature set to rules and light ML engine(s) processor(s) 316B.

Rules and light ML engine(s) processor(s) 316B, responsive to receiving the requested feature set, analyze the feature set with rules and ML models trained to identify non-fraudulent transactions. The rules, as discussed above, rely on more computationally complex features to generate. Furthermore, the ML models may rely, at least partially, on some of those features as well as other features previously and/or partially computed and stored in feature cache 346. Thus, the compute, memory, and bandwidth usage of rules and light ML engine(s) processor(s) 316B is greater than static rules processor(s) 316A, but still represents a resource savings over ML engine(s) processor(s) 316C. Thus, decision logic 322 can determine whether to authorize a transaction based one analysis of rules and light ML engine(s) processor(s) 316B to again exit the progressive fraud detections system 315 early, and to cause the clearing of the feature cache 346.

However, when a determination to authorize the transaction is inconclusive (e.g., all of the rules and ML engines of rules and light ML engine(s) processor(s) 316B fail to identify the transaction as non-fraudulent), the process proceeds to ML engine(s) processor(s) 316C. ML engine(s) processor(s) 316C include a second set of ML engines, which may be the same or different types as those used in rules and light ML engine(s) processor(s) 316B. However, ML engine(s) processor(s) 316C are pretrained to perform a full features ML analysis using a different feature set of any of the prior stages. For example, ML engine(s) processor(s) 316C may request and use a feature set orders of magnitude greater than prior stages, and further the features in the set are more computationally involved to generate due to their nature and timeframe from which they are generated (e.g., a set of features computed from all prior transactions associated with parties to the transaction).

ML engine(s) processor(s) 316C generate a feature event message requesting a set of features corresponding to those used by the ML models of the ML engine(s) processor(s) 316C. The feature event message is communicated to feature manager interface 342, which again uses the feature generator 344 and the feature cache 346, as well as access to data stores, to generate the requested feature set. Feature manager interface 342 returns the computed feature set to ML engine(s) processor(s) 316C.

ML engine(s) processor(s) 316C, upon receiving the feature set, performs one or more ML model based analyses of the feature set (e.g., a single model analysis, an ensemble model analysis, a sequence of models and/or ensembles, etc.). Based on the analysis of the one more ML models, ML engine(s) processor(s) 316C outputs a final fraud determination exiting the progressive fraud detection system 315, and instructs the feature manager 340 to clear the feature cache 346.

Figure 4:
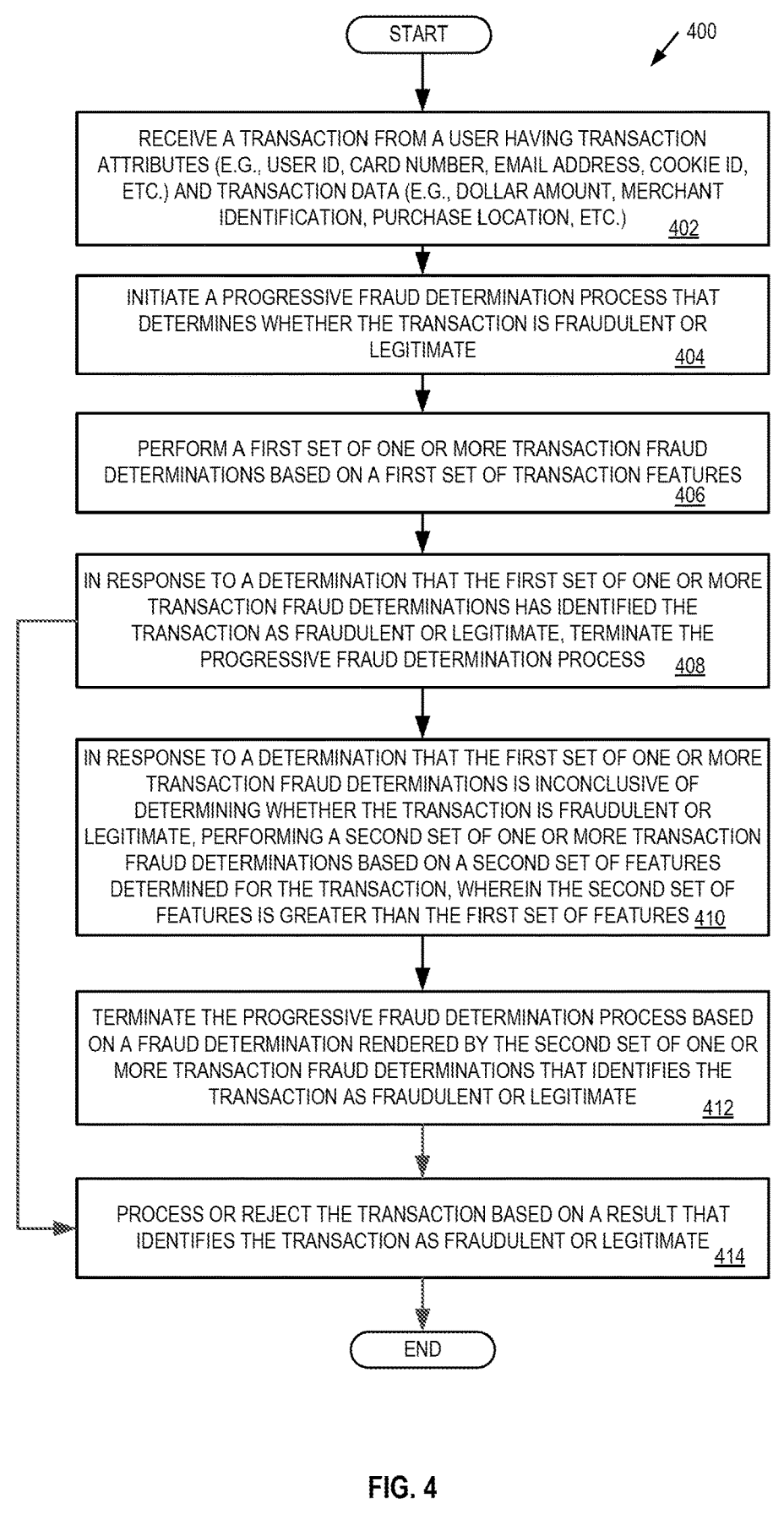

FIG. 4 is a flow diagram of one embodiment of a method 400 for performing efficient progressive fraud detection by a server computer system. The method 400 is performed by processing logic that may comprise hardware (circuitry, dedicated logic, etc.), software (such as is run on a general purpose computer system or a dedicated machine), firmware, or a combination. In one embodiment, the method 400 is performed by a progressive fraud detection system (e.g., progressive fraud detection system 115, 215, or 315).

Referring to FIG. 4, processing logic begins by receiving a transaction from a user having transaction attributes (e.g., a combination of one or more of a user ID, card number, email address, cookie ID, an email address, a telephone number, and a cookie ID, a dollar amount, a transaction date and/or time, a merchant ID for a merchant the generated the transaction request, an internet protocol address of a device originating the transaction, a customer name, a shipping address, a billing address, and a purchase location, etc.) and transaction data (e.g., dollar amount, merchant identification, purchase location, etc.) (processing block 402). As indicated above, the transaction may be one of a plurality of transactions received by processing logic, such as a transaction that is part of a transaction stream.

Processing logic initiates a progressive fraud determination process that determines whether the transaction is fraudulent or legitimate (processing block 404). As discussed above, in embodiments, the fraud determination is performed with a progressive series of stages to enable early and accurate fraud determinations, and thus a resulting early exit from the progressive fraud determination process. When an early exit is achieved, compute, memory, and bandwidth resources are preserved and may be reapplied to other fraud determinations for other transactions. As discussed herein, latency is also improved by enabling early exits to avoid more computationally intensive fraud determination stages, which helps to reduce overall transaction time.

Processing logic performs a first set of one or more transaction fraud determinations based on a first set of transaction features (processing block 406). In embodiments, feature computation may be the most determinative factor in resource consumption of a fraud detection process. Thus, the more features and/or the more complex the feature, the more compute, memory, and network resources are consumed to compute the features. Thus, in embodiments, the first set of transaction features represents a smaller (e.g., in number and/or complexity) set of features that are computationally efficient to compute, and may be re-used at subsequent stage(s) of the progressive fraud determination.

In response to a determination that the first set of one or more transaction fraud determinations has identified the transaction as fraudulent or legitimate, processing logic terminates the progressive fraud determination process (processing block 408). The first set of features is relatively efficient to compute, use, and communicate, and thus exiting the progressive fraud determination process after processing block 408 saves significant computing system resources by avoiding later processing stages of a fraud detection system.

In response to a determination that the first set of one or more transaction fraud determinations is inconclusive of determining whether the transaction is fraudulent or legitimate, performing a second set of one or more transaction fraud determinations based on a second set of features determined for the transaction, wherein the second set of features is greater than the first set of features (processing block 410). This second set of features is a heavier, fuller set of features. In embodiments, the number, type, and depth of the second set of features may be selected based on the rules and/or ML models used by the second set of fraud determinations. In embodiments, the second feature set is only used, and thus only computed, when processing block 410 is reached. Thus, the dedication of compute, memory, and bandwidth resources to computation and generation of this second feature set is allocated to the stage of the progressive fraud determination that relies on those features. Processing logic terminates the progressive fraud determination process based on a fraud determination rendered by the second set of one or more transaction fraud determinations that identifies the transaction as fraudulent or legitimate (processing block 412).

Processing logic then processes or rejects the transaction based on a result that identifies the transaction as fraudulent or legitimate (processing block 414). As discussed herein, the fraud determination used to determine when to process or reject the transaction can include exiting the process for a non-trivial number of transactions. At scale, this is a significant number of transactions, and thus a significant amount of computing resources can be preserved by enabling early exits after a lighter weight fraud determination stage. Furthermore, because feature computation is faster at an early stage in the progress fraud determination process, early exits also reduces the latency in transaction processing for a significant number of transactions. Additionally, the fraud determinations are progressive so that there is no loss in accuracy at each stage. For example, a stage that uses a light ML model to detect legitimate transactions is trained to recognize legitimate transactions to a predetermined accuracy. As a result, early exit from such a stage ensures an accurate decision of non-fraud, and preserves resources as discussed above. However, if an accurate decision cannot be reached, a downstream stage that is more complex and/or more accurate for certain transactions can be executed to ensure appropriate fraud detection processes are implemented.

Figure 5:
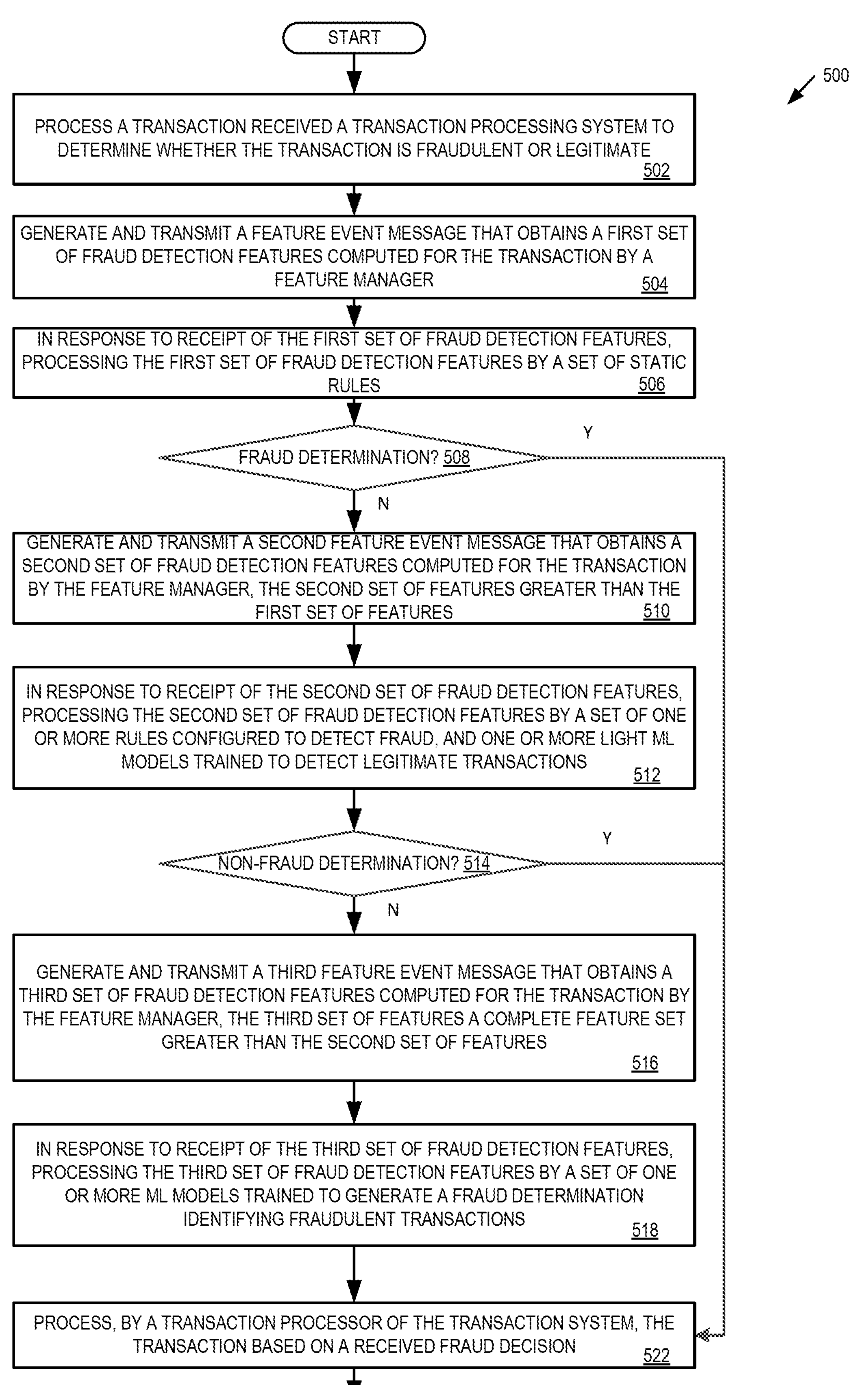
FIG. 5 is a flow diagram of one embodiment of a method for performing efficient progressive fraud detection by a server computer system.

FIG. 5 is a flow diagram of one embodiment of a method 500 for performing efficient progressive fraud detection by a server computer system. The method 500 is performed by processing logic that may comprise hardware (circuitry, dedicated logic, etc.), software (such as is run on a general purpose computer system or a dedicated machine), firmware, or a combination. In one embodiment, the method 500 is performed by a progressive fraud detection system (e.g., progressive fraud detection system 115, 215, or 315).

Referring to FIG. 5, processing logic begins by processing a transaction received by a transaction processing system to determine whether the transaction is fraudulent or legitimate (processing block 502). The transaction processing system may be any type of transaction processing system that seeks to detect fraudulent transactions. In an embodiment, the transaction processing system is a payments processing system, and the transaction is part of a stream of payments transactions.

Processing logic generates and transmits a feature event message that obtains a first set of fraud detection features computed for the transaction by a feature manager (processing block 504). The first set of fraud detection features represents a minimal, but high quality feature sets that are computed for every transaction. Furthermore, as opposed to second and third feature sets discussed below, the first feature set is smaller in number, and has less computationally complex features to generate. As discussed herein, feature computation is often the most resource intensive process for fraud detection. Thus, minimizing the feature set at this first stage ensures that resources are not misallocated to this first stage when a fraud determination can be made and the progressive fraud detection exited early.

In response to receipt of the first set of fraud detection features, processing logic processes the first set of fraud detection features by a set of static rules (processing block 506). The static rules are rules include rules that look to matters of transaction validity, such appropriate formatting, data coherency, allowable transaction types, etc. to easily reject non-conforming transactions which are always bad (e.g., treated as fraudulent for transaction rejection purposes). The static rules may also include detecting transactions that are always allowable, such as recurring transactions using third party payment systems with sufficient guarantees of trust. For example, such guarantees of trust can include transactions involving strong authentication checks that are performed prior to transaction initiation (e.g., establishment of a recurring payment, establishment of an account at a trusted digital payments system, etc.). Identification of the transaction (e.g., an always rejected or always allowable transaction) enables fraud determination (processing block 508) to exit the progressive fraud process early when a conclusive fraud determination can be made.

However, when fraud determination (processing block 508) makes an inconclusive determination of a fraudulent or non-fraudulent nature of the transaction, the process proceeds to processing block 510.

Processing logic generates and transmits a second feature event message that obtains a second set of fraud detection features computed for the transaction by the feature manager, the second set of features greater than the first set of features (processing block 510). The second feature event message is a request to the feature manager for a set of features used by rules and/or light ML models. The second set of features is greater in number and/or computational complexity than the first set of features. Thus, the requesting and processing performed to generate, compute, and obtain the second set consumes more compute, network, and memory resources. However, this second stage of a progressive fraud determination process is configured to use a reduced feature set (e.g., order(s) of magnitude less in number and less complex) than a later third set. Thus, even though this second stage is more computationally intensive than the first stage, an early exit from the second stage still represents a significant savings of processing, memory, and bandwidth usage. Similarly, although latency is greater at the second stage than the first stage, overall transaction latency is still less than having to process the third stage. Therefore, the resource savings and latency reduction enabled by the early exists from the second stage, even if a percentage of the overall number of transactions, represent significant resource utilization and transaction time reduction for the transactions processed by the transaction processing system.

In response to receipt of the second set of fraud detection features, processing the second set of fraud detection features by a set of one or more rules configured to detect fraud, and one or more light ML models trained to detect legitimate transactions (processing block 512). The rules at this second stage are more complex than the rules of the first stage, for example, computing a distance spanning a transaction origin location and a shipment address, computing a number of transactions over a period of time to perform block rate blocking, querying a leaked API key database to determine if an API key supplied for a transaction is invalid, etc. These rules use features that require more computation to obtain. Furthermore, the one or more light ML models, as discussed above, are ML models trained to detect legitimate transactions from a reduced set of features. Thus, the fraud determination processing based on the second set of features at block 512 represents significant resource savings, and latency reduction, over full fraud detection processing.

Identification of the transaction as legitimate/non-fraudulent (e.g., based on the ML model analysis, and satisfaction of the one or more rules) enables fraud determination (processing block 514) to exit the progressive fraud process early when a conclusive determination can be made that the transaction is legitimate.

However, when legitimacy of the transaction is inconclusive (processing block 514), processing logic generates and transmits a third feature event message that obtains a third set of fraud detection features computed for the transaction by the feature manager, the third set of features a complete feature set greater than the second set of features (processing block 516). As discussed herein, the third feature event messages request a complete and full feature set used by a final set of one or more ML models. The third feature set is the most computationally complex to calculate, and is therefore delayed so that resources for computing this third feature set are only allocated to the most challenging fraud determinations (e.g., ones where the first stage and second stage fraud determinations are inconclusive). The third feature event message causes the feature manager to compute the full feature set.

Then, in response to receipt of the third set of fraud detection features, processing the third set of fraud detection features by a set of one or more ML models trained to generate a fraud determination identifying fraudulent transactions (processing block 518). In embodiments, the one or more ML models of the third stage are the most complex in that they rely on the largest number of features as inputs, and often use features with the most computational complexity to generate. The third stage and the one or more ML models used in the third stage are general purpose in the sense that they are trained to make a fraud determination on any transaction. However, only a subset of all transactions reach this third stage, and thus the computational resources used by this stage, and the latency incurred by this stage, are only experienced by that subset of transactions.

Processing logic processes, by a transaction processor of the transaction system, the transaction based on a received fraud decision (processing block 522). In embodiments, the transaction processor uses any fraud decision to process the transaction, such as that generated by the first stage, second stage, third stage, etc. However, because each stage is tuned to make specific fraud and/or non-fraud determinations with a predetermined amount of accuracy, then there is no loss in the overall accuracy of fraud detection, while preserving computational, memory, and bandwidth resources through early fraud detection exits, as discussed herein.

Figure 6:
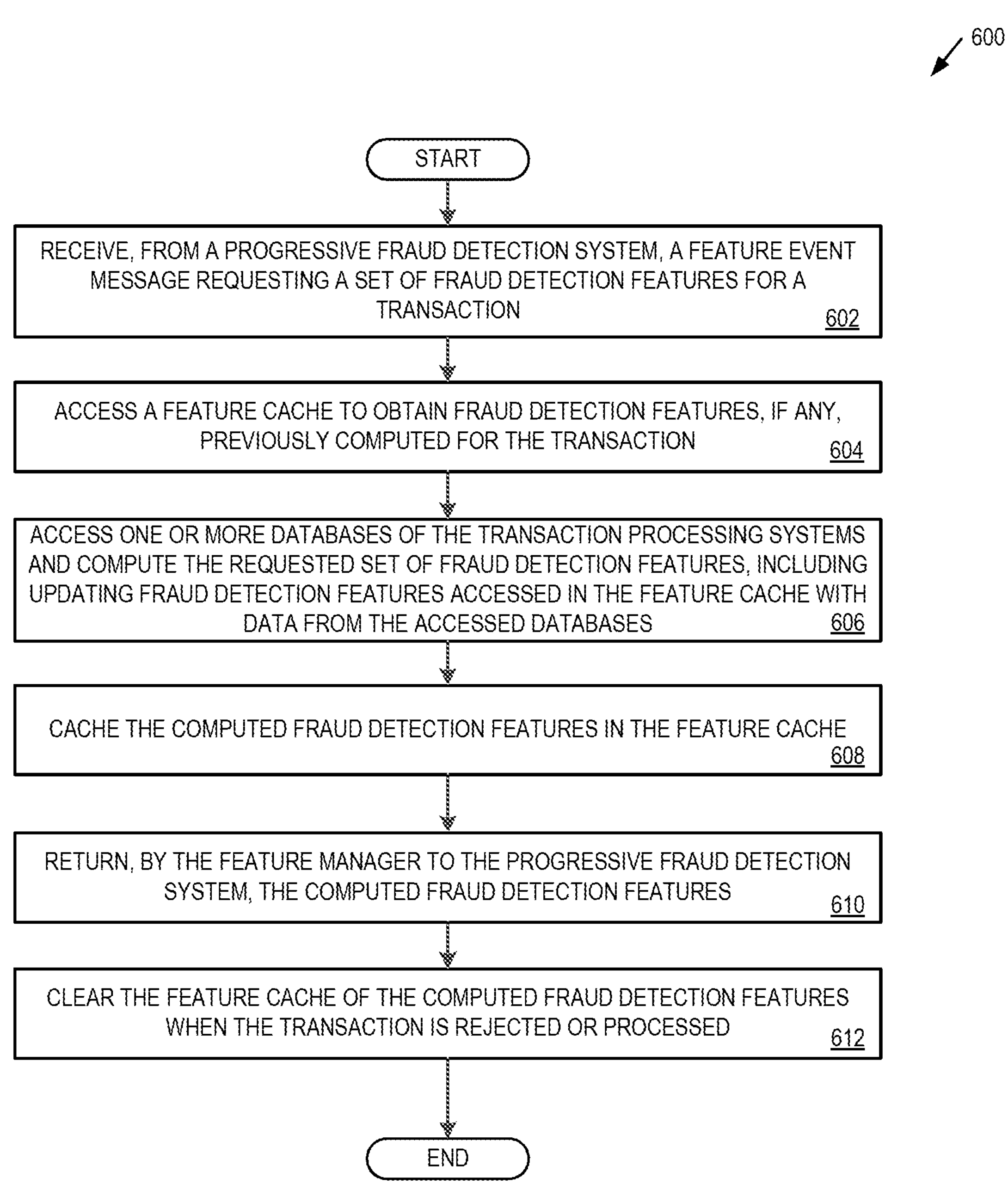
FIG. 6 is a flow diagram of one embodiment of a method for feature management during an efficient progressive fraud detection process.

FIG. 6 is a flow diagram of one embodiment of a method 600 for feature management during an efficient progressive fraud detection process. The method 600 is performed by processing logic that may comprise hardware (circuitry, dedicated logic, etc.), software (such as is run on a general purpose computer system or a dedicated machine), firmware, or a combination. In one embodiment, the method 600 is performed by a feature manager (e.g., feature manager 340).

Referring to FIG. 6, processing logic begins by receiving, from a progressive fraud detection system, a feature event message requesting a set of fraud detection features for a transaction (processing block 602). The feature event message may include a set of feature identifiers to identify the requested features. Furthermore, the feature identifiers may further identify or specify attributes related to the identified features, such as a length of time for which to compute the feature, a number of transactions over which to compute the feature, etc. Alternatively, feature sets may be predefined (e.g., the type and attributes of a set of features), and the feature event message includes an identifier of the requested feature set. In embodiments, this feature event message is generated by processing logic of a progressive fraud detection system, as discussed above in FIGS. 2-5.

Processing logic accesses a feature cache to obtain fraud detection features, if any, previously computed for the transaction (processing block 604). In some embodiments, for a progressive fraud determination, some fraud detection features are partially computed by an earlier stage. For example, a second stage of a progressive fraud determination system may utilize a feature computed over a prior two-week period, whereas a current stage of the progressive fraud determination system utilizes the same feature but computed over a prior quarter. Thus, processing logic need not compute every feature from scratch to reduce feature computation time and processing resources allocated to feature generation tasks.

Processing logic further accesses one or more databases of the transaction processing systems and computes the requested set of fraud detection features, including updating fraud detection features accessed in the feature cache with data from the accessed databases (processing block 606). As discussed herein, this can include accessing a transaction data store and an accounts data store, in addition to the feature cache accessed in block 608. Processing logic then computes the requested features, such as summing block counts for a user, summing block counts for a payment instrument, summing a total number of payment instructions, determining a total number of transactions processed, etc.

Processing logic then caches the computed fraud detection features in the feature cache (processing block 610). The feature cache is maintained for the life of a transaction. Thus, caching of features enables later stages to more efficiently generate their features by using fully or partially computed results of prior stages.

Processing logic returns, to the progressive fraud detection system, the computed fraud detection features (processing block 610). In embodiments, the computed features are returned in a feature events message exchange, as discussed herein.

Processing logic clears the feature cache of the computed fraud detection features when the transaction is rejected or processed (processing block 612). In embodiments, the feature cache is maintained for the life of a transaction, to enable later analysis stages to more efficiently compute feature sets of those stages by re-using fully and/or partially computed features. However, when a conclusive fraud or non-fraud determination can be made at any stage of a progressive fraud detection process, then the fraud detection process is considered concluded. Therefore, in response to this occurring (e.g., providing a final decision on fraud or non-fraud), the feature cache is cleared for the transactions, which frees available memory in the feature cache for use during fraud detection of other transactions.

Figure 7:
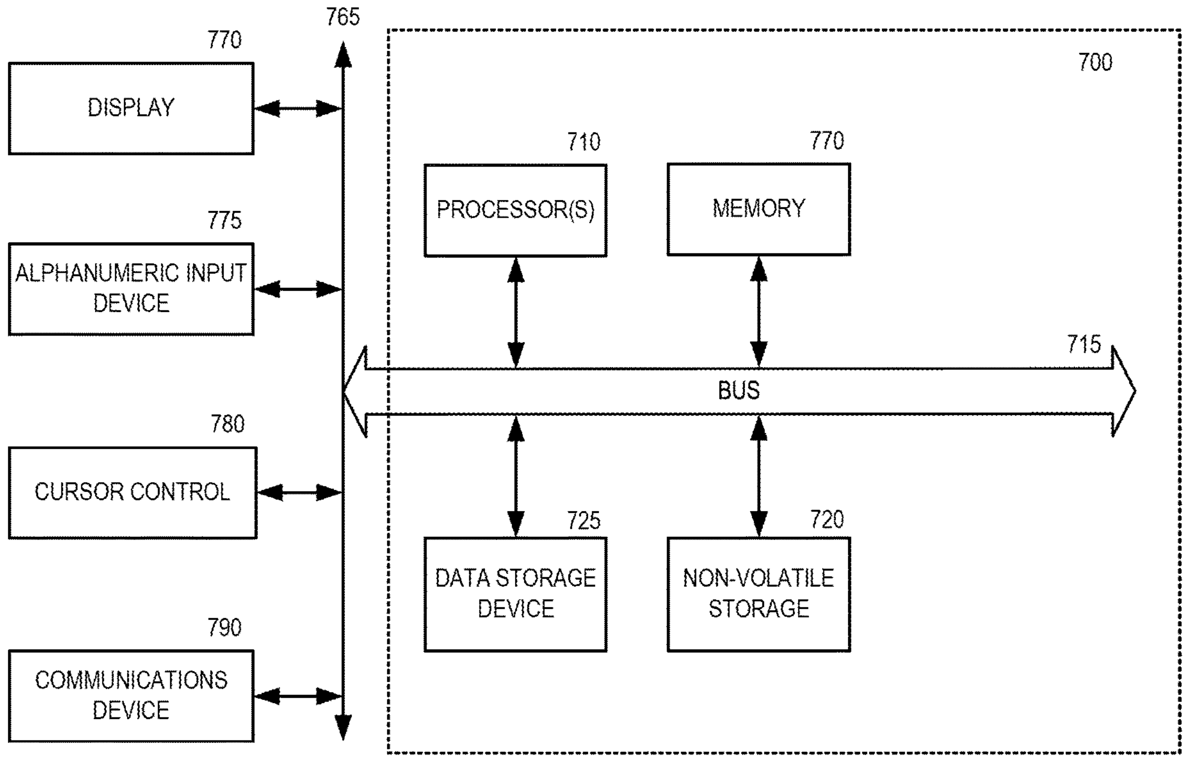
FIG. 7 is one embodiment of a computer system that may be used to support the systems and operations discussed herein.

FIG. 7 is one embodiment of a computer system that may be used to support the systems and operations discussed herein. For example, the computer system illustrated in FIG. 7 may be used by a commerce platform system, a merchant development system, merchant user system, etc. It will be apparent to those of ordinary skill in the art, however that other alternative systems of various system architectures may also be used.

The data processing system illustrated in FIG. 7 includes a bus or other internal communication means 715 for communicating information, and a processor 710 coupled to the bus 715 for processing information. The system further comprises a random access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a light emitting diode (LED) display or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a touchpad, mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, or any other mechanism that provides connectivity between the computer system 700 and the outside world. Note that any or all of the components of this system illustrated in FIG. 7 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The embodiments discussed herein may also be embodied in a handheld or portable device containing a subset of the computer hardware components described above. For example, the handheld device may be configured to contain only the bus 715, the processor 710, and memory 750 and/or 725. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for fraud detection performed by a server computer system, the method comprising:

receiving, by the server computer system, a transaction from a user having transaction attributes and transaction data;

initiating, by the server computer system, a progressive fraud determination process that determines whether the transaction is fraudulent or legitimate using a sequence of different fraud detection processors;

generating and transmitting, by a first fraud detection processor executed by the server computer system to a feature management system, a first electronic message that requests a first set of features associated with the transaction;

performing, by the first fraud detection processor executed by the server computer system, a first set of one or more transaction fraud determinations based on the first set of features determined for the transaction, wherein the first set of features comprises a set of static rule fraud determinations executed by the first fraud detection processor, and wherein the first set of one or more transaction fraud determinations are received as a first feature response message from the feature management system;

determining the first set of one or more transaction fraud determinations is inconclusive of determining whether the transaction is fraudulent or legitimate;

generating and transmitting, by a second fraud detection processor executed by the server computer system to the feature management system, a second electronic message that requests a second set of features associated with the transaction, and performing, by the second fraud detection processor executed by the server computer system, a second set of one or more transaction fraud determinations based on the second set of features determined for the transaction, wherein performing the second set of one or more fraud determinations by the second fraud detection processor comprises applying at least one machine learning model trained to identify legitimate transactions based on the second set of features, and the second set of one or more transaction fraud determinations are received as a second feature response message from the feature management system, wherein the second set of features is greater than the first set of features;

determining, by the server computer system, that the second set of one or more transaction fraud determinations identify the transaction as legitimate; and halting, by the server computer system, the second fraud detection processor from performing the progressive fraud determination process; and transmitting, by the server computer system via a computer network, an instruction to a transaction management system to process the transaction.

2. The method of claim 1, the method further comprising:

determining that a second set of one or more transaction fraud determinations of a second transaction do not identify the second transaction as legitimate; and generating and transmitting, by a third fraud detection processor executed by the server computer system to the feature management system, a third electronic message that requests a third set of features associated with the second transaction, and performing, by the third fraud detection processor executed by the server computer system, a third set of one or more transaction fraud determinations based on the third set of features determined for the second transaction and received as a third feature response message from the feature management system, wherein the third set of one or more transaction fraud determinations determines whether the second transaction is fraudulent, and wherein the third set of features is a maximum set of transaction features that is greater than the second set of features; and terminating, by the server computer system, the progressive fraud determination process to process or reject the second transaction based on a fraud determination rendered by the third set of one or more transaction fraud determinations that identifies the second transaction as fraudulent or legitimate.

3. The method of claim 2, wherein terminating the progressive fraud determination process after the third set of one or more transaction fraud determinations comprises:

transmitting an instruction to the transaction management system to process the second transaction or reject the second transaction based on a fraud determination result generated by the third set of one or more transaction fraud determinations.

4. The method of claim 2, wherein the third set of one or more transaction fraud determinations executed by the third fraud detection processor comprises at least one machine learning model trained to identify fraudulent transactions based on the third set of features.

5. The method of claim 1, wherein the set of static rule fraud determinations comprise one or more of: a validity determination of an application programming interface (API) key received with the transaction, a determination that the API key is associated with a merchant from which the transaction was received, a transaction type determination of the received transaction, a coherency check on payment information received with the transaction, an amount of the transaction is non-negative and/or valid, parameters and/or an API request is valid for the received transaction, and a check of a location of the transaction against a set of blocked transaction locations.

6. The method of claim 2, wherein the third set of features comprises at least an order of magnitude number of features greater than a number of features in the second set of features associated with processing the second transaction, and wherein at least one feature in the third set of features is generated from a greater number of database records corresponding to the type of the features.

7. The method of claim 1, further comprising:

caching, in a memory of the feature management system, each generated requested set of features in a feature cache for a life of the transaction; and clearing, by the feature management system, the generated requested set of features from the feature cache when the transaction is concluded.

8. The method of claim 7, further comprising:

receiving, by the feature management system, a request to generate a requested set of features;

determining, by the feature management system, whether any feature in the requested set of features is partially or fully computed and stored in the feature cache;

for each fully computed feature stored in the feature cache, using, by the feature management system, the stored version of said each feature for the generation of the requested set of features;

for each partially computed feature stored in the feature cache, computing, by the feature management system, an update to a cached version of said each partially computed feature to transform said each partially computed feature into a fully computed feature, and caching, by the feature management system in the memory, the fully computed feature in the feature cache; and for each new feature in the requested set of features that is not at least partially computed, computing, by the feature management system, said each new feature for the requested set of features, and caching, by the feature management system in the memory, said each new feature in the feature cache.

9. The method of claim 1, further comprising:

processing or rejecting the transaction based on a result that identifies the transaction as fraudulent or legitimate.

10. The method of claim 1, wherein the transaction attributes comprise one or more of a user identifier (ID), a card number, an email address, a telephone number, and a cookie ID, and wherein the transaction data comprises one or more of a dollar amount, a transaction date and/or time, a merchant ID for a merchant that generated the transaction request, an internet protocol address, a customer name, a shipping address, a billing address, and a purchase location.

11. A non-transitory computer readable storage medium having instructions stored therein, which when executed by a server computer system, causes the server computer system to perform operations for fraud detection, the operations comprising:

receiving a transaction from a user having transaction attributes and transaction data;

initiating a progressive fraud determination process that determines whether the transaction is fraudulent or legitimate using a sequence of different fraud detection processors;

generating and transmitting, by a first fraud detection processor executed by the server computer system to a feature management system, a first electronic message that requests a first set of features associated with the transaction;

performing, by the first fraud detection processor, a first set of one or more transaction fraud determinations based on the first set of features determined for the transaction, wherein the first set of features comprises a set of static rule fraud determinations executed by the first fraud detection processor, and wherein the first set of one or more transaction fraud determinations are received as a first feature response message from the feature management system;

in response to a determination that the first set of one or more transaction fraud determinations has identified the transaction as fraudulent or legitimate, terminating the progressive fraud determination process;

in response to a determination that the first set of one or more transaction fraud determinations is inconclusive of determining whether the transaction is fraudulent or legitimate, generating and transmitting, by a second fraud detection processor executed by the server computer system to the feature management system, a second electronic message that requests a second set of features associated with the transaction, and performing by the second fraud detection processor, a second set of one or more transaction fraud determinations based on the second set of features determined for the transaction, wherein performing the second set of one or more fraud determinations by the second fraud detection processor comprises applying at least one machine learning model trained to identify legitimate transactions based on the second set of features, and the second set of one or more transaction fraud determinations are received as a second feature response message from the feature management system, wherein the second set of features is greater than the first set of features;

determining whether the second set of one or more transaction fraud determinations identify the transaction as legitimate; and in response to a determination that the second set of one or more transaction fraud determinations identify the transaction as legitimate, halting the second fraud detection processor from performing the progressive fraud determination process; and transmitting, by the server computer system via a computer network, an instruction to a transaction management system to process the transaction.

12. The non-transitory computer readable storage medium of claim 11, the operations further comprising:

in response to a determination that the second set of one or more transaction fraud determinations do not identify the transaction as legitimate, generating and transmitting, by a third fraud detection processor executed by the server computer system to a feature management system, a third electronic message that requests a third set of features associated with the transaction, and performing, by the third fraud detection processor executed by the server computer system, a third set of one or more transaction fraud determinations based on the third set of features determined for the transaction and received as a third feature response message from the feature management system, wherein the third set of one or more transaction fraud determinations determines whether the transaction is fraudulent, and wherein the third set of features is a maximum set of transaction features that is greater than the second set of features; and terminating, by the server computer system, the progressive fraud determination process to process or reject the transaction based on a fraud determination rendered by the third set of one or more transaction fraud determinations that identifies the transaction as fraudulent or legitimate.

13. The non-transitory computer readable storage medium of claim 12, wherein terminating the progressive fraud determination process after the first set of one or more transaction fraud determinations, the second set of one or more transaction fraud determinations, or the third set of one or more transaction fraud determinations comprises:

transmitting an instruction to the transaction management system to process the transaction or reject the transaction based on a fraud determination result generated by the first set of one or more transaction fraud determinations, the second set of one or more transaction fraud determinations, or the third set of one or more transaction fraud determinations.

14. The non-transitory computer readable storage medium of claim 12, wherein the first set of one or more transaction fraud determinations comprises a set of static rule fraud determinations executed by the first fraud detection processor, wherein the second set of one or more fraud determinations executed by the second fraud detection processor comprises at least one machine learning model trained to identify legitimate transactions based on the second set of features, and wherein the third set of one or more transaction fraud determinations executed by the third fraud detection processor comprises at least one machine learning model trained to identify fraudulent transactions based on the third set of features.

15. The non-transitory computer readable storage medium of claim 12, the operations further comprising:

caching, in a memory of the feature management system, each generated requested set of features in a feature cache for a life of the transaction; and clearing, by the feature management system, the generated requested set of features from the feature cache when the transaction is concluded.

16. A server computer system, comprising:

one or more processors; and a memory storing instruction, which when executed by the one or more processors, cause the server computer system to perform operations, comprising:

receiving a transaction from a user having transaction attributes and transaction data;

initiating a progressive fraud determination process that determines whether the transaction is fraudulent or legitimate using a sequence of different fraud detection processors;

generating and transmitting, by a first fraud detection processor executed by the server computer system to a feature management system, a first electronic message that requests a first set of features associated with the transaction;

performing, by the first fraud detection processor, a first set of one or more transaction fraud determinations based on the first set of features determined for the transaction, wherein the first set of features comprises a set of static rule fraud determinations executed by the first fraud detection processor, and wherein the first set of one or more transaction fraud determinations are received as a first feature response message from the feature management system;

in response to a determination that the first set of one or more transaction fraud determinations has identified the transaction as fraudulent or legitimate, terminating the progressive fraud determination process;

in response to a determination that the first set of one or more transaction fraud determinations is inconclusive of determining whether the transaction is fraudulent or legitimate, generating and transmitting, by a second fraud detection processor executed by the server computer system to the feature management system, a second electronic message that requests a second set of features associated with the transaction, and performing by the second fraud detection processor, a second set of one or more transaction fraud determinations based on the second set of features determined for the transaction, wherein performing the second set of one or more fraud determinations by the second fraud detection processor comprises applying at least one machine learning model trained to identify legitimate transactions based on the second set of features, and the second set of one or more transaction fraud determinations are received as a second feature response message from the feature management system, wherein the second set of features is greater than the first set of features;

determining whether the second set of one or more transaction fraud determinations identify the transaction as legitimate; and in response to a determination that the second set of one or more transaction fraud determinations identify the transaction as legitimate, halting the second fraud detection processor from performing the progressive fraud determination process; and transmitting, by the server computer system via a computer network, an instruction to a transaction management system to process the transaction.

17. The server computer system of claim 16, the operations further comprising:

in response to a determination that the second set of one or more transaction fraud determinations do not identify the transaction as legitimate, generating and transmitting, by a third fraud detection processor executed by the server computer system to a feature management system, a third electronic message that requests a third set of features associated with the transaction, and performing, by the third fraud detection processor executed by the server computer system, a third set of one or more transaction fraud determinations based on the third set of features determined for the transaction and received as a third feature response message from the feature management system, wherein the third set of one or more transaction fraud determinations determines whether the transaction is fraudulent, and wherein the third set of features is a maximum set of transaction features that is greater than the second set of features; and terminating, by the server computer system, the progressive fraud determination process to process or reject the transaction based on a fraud determination rendered by the third set of one or more transaction fraud determinations that identifies the transaction as fraudulent or legitimate.

18. The server computer system of claim 17, wherein the operations for terminating the progressive fraud determination process after the first set of one or more transaction fraud determinations, the second set of one or more transaction fraud determinations, or the third set of one or more transaction fraud determinations comprise:

transmitting an instruction to the transaction management system to process the transaction or reject the transaction based on a fraud determination result generated by the first set of one or more transaction fraud determinations, the second set of one or more transaction fraud determinations, or the third set of one or more transaction fraud determinations.

19. The server computer system of claim 17, wherein the first set of one or more transaction fraud determinations comprises a set of static rule fraud determinations executed by the first fraud detection processor, wherein the second set of one or more fraud determinations executed by the second fraud detection processor comprises at least one machine learning model trained to identify legitimate transactions based on the second set of features, and wherein the third set of one or more transaction fraud determinations executed by the third fraud detection processor comprises at least one machine learning model trained to identify fraudulent transactions based on the third set of features.

20. The server computer system of claim 17, the operations further comprising:

caching, in a memory of the feature management system, each generated requested set of features in a feature cache for a life of the transaction; and clearing, by the feature management system, the generated requested set of features from the feature cache when the transaction is concluded.

* * * * *